(12) United States Patent
Ray et al.

(10) Patent No.: US 8,341,537 B2
(45) Date of Patent: Dec. 25, 2012

(54) INDICATION OF DELAYED CONTENT OUTPUT IN A USER INTERFACE

(75) Inventors: Ethan Ray, Redmond, WA (US); Hauke A. Gentzkow, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1718 days.

(21) Appl. No.: 11/276,450

(22) Filed: Feb. 28, 2006

(65) Prior Publication Data

US 2007/0204239 A1  Aug. 30, 2007

(51) Int. Cl.
*G06F 3/048* (2006.01)
*G06F 3/00* (2006.01)

(52) U.S. Cl. ........ 715/763; 715/764; 715/810; 715/760; 715/861; 715/711; 715/709; 715/859; 715/856

(58) Field of Classification Search ................... 715/772, 715/711, 862, 705, 709, 715, 760, 856, 859, 715/861; 345/711, 714, 715
See application file for complete search history.

(56) References Cited

U.S. PATENT DOCUMENTS

| | | | |
|---|---|---|---|
| 5,301,348 A * | 4/1994 | Jaaskelainen | 714/46 |
| 5,801,698 A * | 9/1998 | Lection et al. | 715/861 |
| 5,937,417 A * | 8/1999 | Nielsen | 715/207 |
| 5,953,010 A * | 9/1999 | Kampe et al. | 715/772 |
| 5,995,101 A * | 11/1999 | Clark et al. | 715/711 |
| 6,097,390 A * | 8/2000 | Marks | 715/772 |
| 6,100,871 A * | 8/2000 | Min | 715/861 |
| 6,100,887 A * | 8/2000 | Bormann et al. | 715/764 |
| 6,104,397 A * | 8/2000 | Ryan et al. | 715/846 |
| 6,542,164 B2 * | 4/2003 | Graham | 715/711 |
| 6,563,514 B1 * | 5/2003 | Samar | 715/711 |
| 6,809,720 B2 * | 10/2004 | Malamud et al. | 345/157 |
| 6,812,938 B2 * | 11/2004 | Pinnell | 715/741 |
| 6,848,075 B1 * | 1/2005 | Becker et al. | 715/205 |
| 6,874,126 B1 * | 3/2005 | Lapidous | 715/711 |
| 6,901,557 B1 * | 5/2005 | Martinez et al. | 715/772 |
| 6,901,558 B1 * | 5/2005 | Andreas et al. | 715/772 |
| 6,927,770 B2 * | 8/2005 | Ording | 345/440 |
| 7,143,362 B2 * | 11/2006 | Dieberger et al. | 715/764 |
| 7,228,506 B2 * | 6/2007 | Ivanovic et al. | 715/772 |
| 7,370,277 B1 * | 5/2008 | Canfield et al. | 715/752 |
| 7,395,500 B2 * | 7/2008 | Whittle et al. | 715/243 |
| 7,421,661 B1 * | 9/2008 | Canfield et al. | 715/752 |

(Continued)

FOREIGN PATENT DOCUMENTS

CN 1434948 8/2003

(Continued)

OTHER PUBLICATIONS

PCT International Search Report and Written Opinion for PCT Application No. PCT/US2007/004791 mailed on Jul. 30, 2007, 9 pgs.

(Continued)

*Primary Examiner* — Mark Rinehart
*Assistant Examiner* — Erik Stitt
(74) *Attorney, Agent, or Firm* — Lee & Hayes, PLLC

(57) ABSTRACT

Indication of delayed content output is described. In an implementation, content is output for display as a user interface having one or more selectable elements. When a cursor is positioned proximally to one of the selectable elements, a graphical symbol is output in the user interface that indicates a delay of a user-specified amount of time before additional content is displayed.

14 Claims, 6 Drawing Sheets

U.S. PATENT DOCUMENTS

| | | | |
|---|---|---|---|
| 7,480,863 B2 * | 1/2009 | Branson et al. | 715/711 |
| 7,533,340 B2 * | 5/2009 | Hudson et al. | 715/711 |
| 7,685,519 B1 * | 3/2010 | Duncan et al. | 715/711 |
| 2004/0095371 A1 * | 5/2004 | Haynes et al. | 345/711 |
| 2004/0109030 A1 * | 6/2004 | Farrington et al. | 345/808 |
| 2004/0204128 A1 | 10/2004 | Zakharia et al. | |
| 2005/0071773 A1 * | 3/2005 | Ivanovic et al. | 715/768 |
| 2005/0091609 A1 * | 4/2005 | Matthews et al. | 715/804 |
| 2005/0091614 A1 * | 4/2005 | Wasko et al. | 715/861 |
| 2006/0022955 A1 | 2/2006 | Kennedy | |
| 2006/0277477 A1 * | 12/2006 | Christenson | 715/760 |
| 2007/0038963 A1 * | 2/2007 | Moore | 715/859 |
| 2007/0162898 A1 * | 7/2007 | Ramani et al. | 717/135 |
| 2007/0174230 A1 * | 7/2007 | Martin | 707/1 |
| 2008/0244460 A1 * | 10/2008 | Louch | 715/856 |

FOREIGN PATENT DOCUMENTS

| | | |
|---|---|---|
| JP | 2005018222 A | 1/2005 |
| KR | 20020027174 A | 4/2002 |

OTHER PUBLICATIONS

Chinese Office Action mailed Feb. 16, 2012 for Chinese patent application No. 20078006729.8, a counterpart foreign application of U.S. Appl. No. 11/276,450, 11 pages.

Translated Chinese Office Action mailed Aug. 23, 2011 for Chinese patent application No. 20078006729.8, a counterpart foreign application of U.S. Appl. No. 11/276,450, 11 pages.

Chinese Office Action mailed Jun. 5, 2012 for Chinese patent application No. 20078006729.8, a counterpart foreign application of U.S. Appl. No. 11/276,450, 11 pages.

\* cited by examiner

600

INDICATION OF DELAYED CONTENT OUTPUT IN A USER INTERFACE

BACKGROUND

Users are continually exposed to a wide range of content. For example, the user may execute applications locally on a computer, such as word processing applications, spreadsheet applications, presentation applications, graphical design applications, note taking applications, and so on. Additionally, the user may be exposed to content obtained from over a network, such as web pages viewed through use of a web browser, downloadable music, and so on.

Because the user may be exposed to such a wide variety of content, techniques have been developed to navigate between content, such as from within the content itself to display other related content. For example, a web page may contain links to other web pages that contain related content. However, because a substantial amount of content may be related to the current content, a vast number of links may be included within the web page. This may result in confusion on the part of a user when trying to locate a particular link of interest from within this vast number of links. Therefore, efficiencies that were desired by including the links (e.g., to quickly navigate to another web page) were lessened by the complications encountered in locating desirable links, which may diminish the user's experience with the content as a whole.

SUMMARY

Indication of delayed content output is described. In an implementation, content is output for display as a user interface having one or more selectable elements, such as hyperlinks. When a cursor is positioned proximally to one of the selectable elements, a graphical symbol is output in the user interface that indicates a delay of a user-specified amount of time before additional content is displayed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same reference numbers are utilized in instances in the discussion to reference like structures and components.

DETAILED DESCRIPTION

Overview

Users have access to a wide variety of content from a wide variety of sources, such as over a network, through local execution of an application by a client device (e.g., a desktop computer), and so on. To provide navigation between and output of related content, a variety of techniques may be employed.

The content, for example, may include selectable elements (e.g., hyperlinks, icons, and so on) that, when selected, provide for display of additional content. For instance, the content may include a hyperlink to other content such that the user may navigate between web pages, document sections, and so on. In another instance, a web page or application user interface may provide additional detail and actions that may be performed in relation to the content through use of a pop-up menu, such as a definition of a particular term. However, it may be difficult to determine in a user interface as to which elements offer this functionality. Further, the user may not wish to have interaction with the content interrupted by the output of the pop-up menu in some instances.

Accordingly, in an implementation, a graphical symbol is utilized to indicate that additional content is available. For example, a hyperlink may be displayed in a user interface. When the user positions a cursor on or next to the representation, a graphical symbol may be immediately displayed proximally to the representation that indicates that the additional content is available. The graphical symbol may also employ a delay such that the additional content is not displayed until a predetermined amount of time has passed with the cursor positioned on or near the representation. In this way, the user is informed of the availability of additional content and may cause output of the content by keeping the cursor positioned on or near the representation. Further, by "hiding" the graphical symbol until the cursor is positioned next to the representation, the user interface may be displayed in a manner having reduced "clutter", although it should be apparent that such a symbol may be displayed continually without departing from the spirit and scope thereof. Further discussion of techniques that employ the graphical symbol may be found in relation to FIGS. 2-6.

In the following discussion, an exemplary environment is first described which is operable to employ techniques that provide for indication of delayed content output in a user interface. Exemplary procedures and user interfaces are then described which are operable in the described environment, as well as in other environments.

Exemplary Environment

Figure 1:
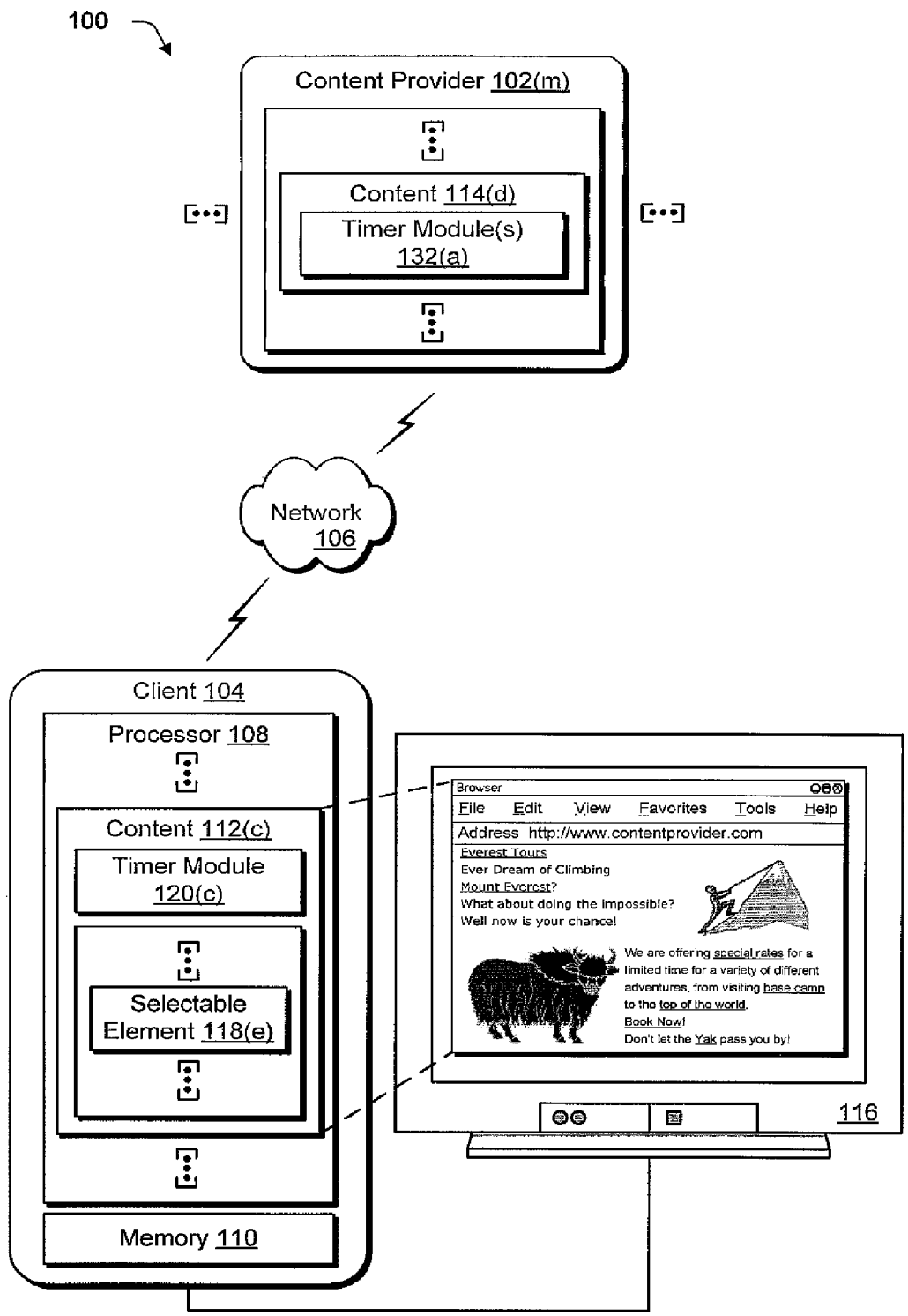
FIG. 1 is an illustration of an environment in an exemplary implementation that is operable to employ techniques that provides for indication of delayed content output in a user interface.

FIG. 1 illustrates an environment 100 in an exemplary implementation that is operable to employ techniques that provides for indication of delayed content output in a user interface. The illustrated environment 100 includes a plurality of content providers 102(m) (where "m" can be any integer from one to "M") communicatively coupled to a client 104 over a network 106. The client 104 may be configured in a variety of ways for accessing the content provider 102(m). For example, the client 104 may be configured as a computing device, such as a desktop computer, a mobile station, an entertainment appliance, a set-top box communicatively coupled to a display device, a wireless phone, a game console, and so forth. Thus, the client 104 may range from a full resource device with substantial memory and processor resources (e.g., personal computers, game consoles) to a low-resource device with limited memory and/or processing resources (e.g., traditional set-top boxes, hand-held game consoles). For purposes of the following discussion, the client 104 may also relate to a person and/or entity that operate the client. In other words, the clients 104 may describe logical clients that include users, software, and/or devices.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

The client 104 is illustrated in FIG. 1 as a client device that includes a processor 108 and memory 110. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 110 is shown for the client 104, a wide variety of types and combinations of memory may be employed, such as random access memory (RAM), hard disk memory, removable medium memory, and so forth.

The client 104 is also illustrated as executing a plurality of content 112(c) (where "c" can be any integer from one to "C") on the processor 108, which is also storable in memory 110. The content 112(c) may be configured in a variety of ways. For example, the content may be generated through execution of an application module locally on the client 104, such as a word processing application, spreadsheet application, drawing application, note-taking application, presentation application, and so on. The content may also be generated at least in part from content 114(d) (where "d" can be any integer from one to "D") obtained from the content provider 102(m) over the network 106. For example, the client 104 may execute a browser that provides interaction with web pages, downloadable songs, documents, results of remote application processing, games and so on that are obtained from the content provider 102(m). The content may then be output by the client 104 for rendering on a display device 116.

As previously described, because there is such a wide variety of content, navigation and display of content to a user in an efficient manner may be difficult. To provide for such navigation and display, the content 112(c) may include a plurality of selectable elements 118(e) (where "e" can be any integer from one to "E") that, when selected, provide an output of additional content. For example, the selectable element 118(e) may be configured as a hyperlink to other content that might be of interest, an icon that causes a pop-up menu, and so on.

As previously described, in some instances the content 112(c) may include a vast number of selectable elements 118(e). Further, one or more of these selectable elements 118(e) may be configured to provide an output of additional content, such as in conjunction with the content 112(c), navigating to other content, and so on. To give the user an opportunity to decide whether output of the additional content is desired, the content 112(c) may incorporate a timer module 120(c). The timer module 120(c) is representative of functionality that may be employed to delay output of the additional content for a predetermined and/or user specified amount of time, and therefore is not limited to inclusion in the content 112(c), e.g., the timer module 120(c) may also be implemented as a stand-alone module, within an operating system, and so on.

When a user positions a cursor next to the selectable element 118(e), the timer module 120(c) may output an indication of a delay for a predetermined amount of time, after which, additional content is output. Therefore, the user is given the option of whether to have the additional content output (e.g., by leaving the cursor positioned proximally to the selectable element 118(e)) and is also given an indication that additional content output is pending through use of the indication. Similar functionality may also be provided in content 114(d) received from over the network 106, which is illustrated in FIG. 1 through incorporation of a timer module 122(d) with content 114(d). The indication may be configured in a variety of different ways, further discussion of which may be found in relation to the following figures.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, such as the memory 110 of client 104. The features of the delayed content output techniques described below are platform-independent, meaning that the techniques may be implemented on a variety of commercial computing platforms having a variety of processors.

Exemplary Procedures and User Interfaces

The following discussion describes delayed content output techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1.

Figure 2:
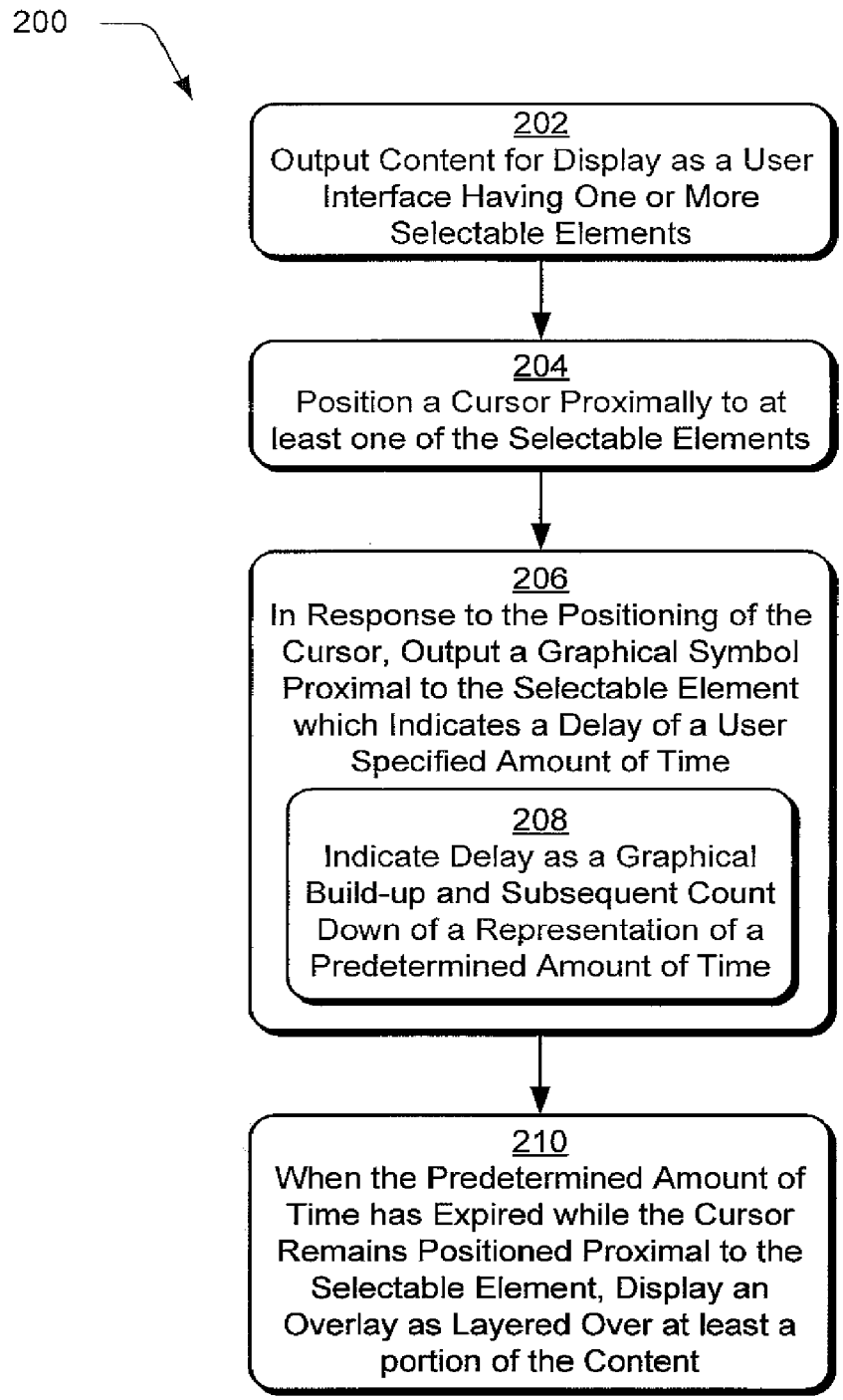
FIG. 2 is a flow diagram depicting a procedure in an exemplary implementation in which an indication of a delay is output before display of additional content relating to a selectable element.

FIG. 2 depicts a procedure 200 in an exemplary implementation in which an indication of a delay is output before display of additional content relating to a selectable element. During the discussion of the procedure 200 of FIG. 2, reference will also be made to the user interface 300 of FIG. 3 and the depiction of an animation of a delay element of FIG. 4.

Figure 3:
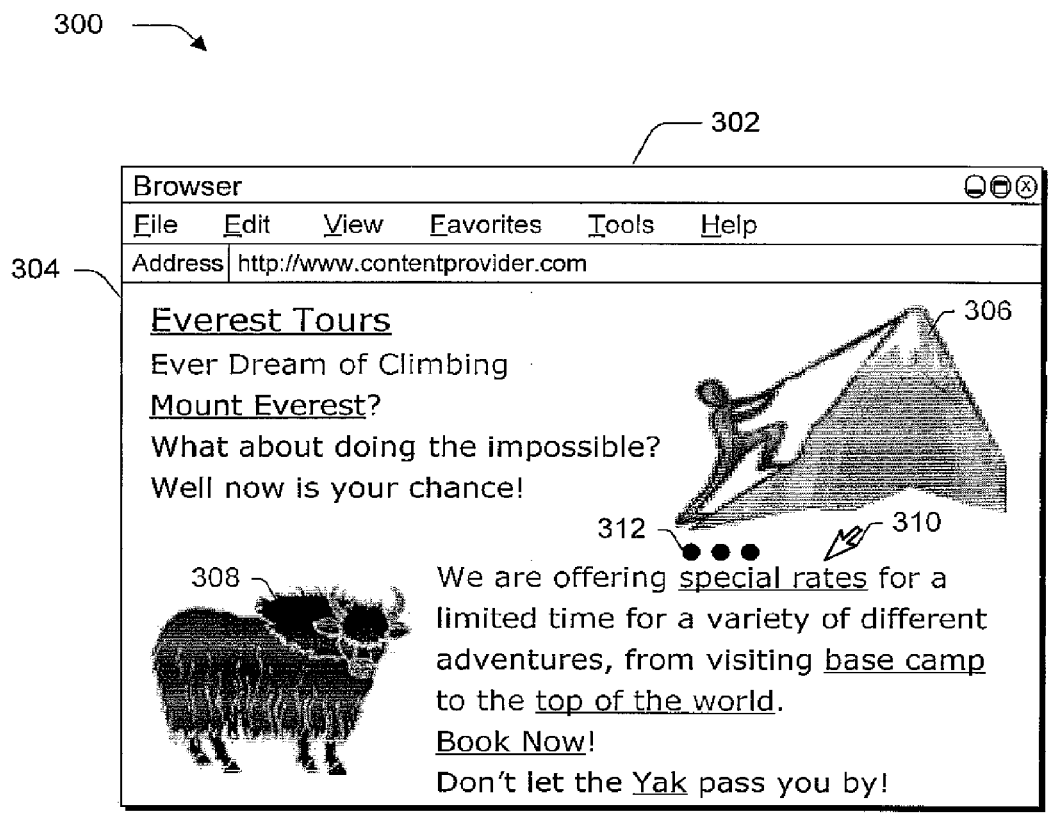
FIG. 3 is an illustration of an exemplary user interface having a plurality of selectable elements and an indication of a delay before additional content is output that relates to a particular one of the selectable elements.

Content is output for display as a user interface having one or more selectable elements (block 202). For example, the user interface 300 of FIG. 3 is illustrated as a browser user interface 302 that includes a display of content 304, which may correspond to content 114(d) obtained from over the network 106, although content local to the client 104 is also contemplated. The content 304 includes a plurality of selectable elements (e.g., hyperlinks, icons, and so forth), which may be configured in a variety of different ways. For example, the text "Everest Tours", "Mount Everest", "special rates", "base camp", "top of the world", "Book Now!" and "Yak" are each underlined to indicate to a user that these selectable elements represent actions that may be initiated to perform an action, such as to cause an output of related content. Images (e.g., the image of the mountain 306 and the yak 308) may also be configured as selectable elements.

Initiation of the selectable elements may be performed in a variety of ways, such as by positioning a cursor 310 "over" the selectable element "special rates" and then "clicking" on the selectable element to initiate the action. A variety of other techniques may also be employed to initiate the selectable element, such as by "tabbing through" the selectable elements in the user interface 302 until a desired on is reached and then inputting an "enter" command, initiation through use of a touch screen, and so on.

The selectable elements may also provide output of additional content without requiring manual initiation (e.g., "clicking") on the part of the user. For example, the cursor 310 may be positioned proximally to at least one of the selectable elements (block 204), such as the selectable element "special rates". In response to the positioning of the cursor, a graphical symbol is output proximal to the selectable element, which indicates a delay of a user specified amount of time (block 206). For instance, a graphical symbol 312 of FIG. 3 is illustrated as "above" the selectable element "special rates". The graphical symbol is configured to indicate that a certain amount of time will pass before additional content is displayed. In this way, the graphical symbol notifies the user that the selectable element (e.g., "special rates") is configured to provide additional content but does not provide that content immediately. Therefore, the user may decide whether viewing of the additional content is desired (and therefore keep the cursor positioned proximally to the selectable element) or not desired, and therefore not have the additional content interrupt the user's interaction with the currently displayed content. For instance, traditional techniques that provided pop-up menus immediately upon navigation between elements typically cluttered the display and interrupted the user's view of the underlying content. Further, these traditional techniques did not give the user the option of whether to view the pop-up menu. However, the techniques described herein do give the user that option by simply navigating away from the selectable element, yet still gives the user an immediate indication that additional content is available, should the user so choose.

Figure 4:
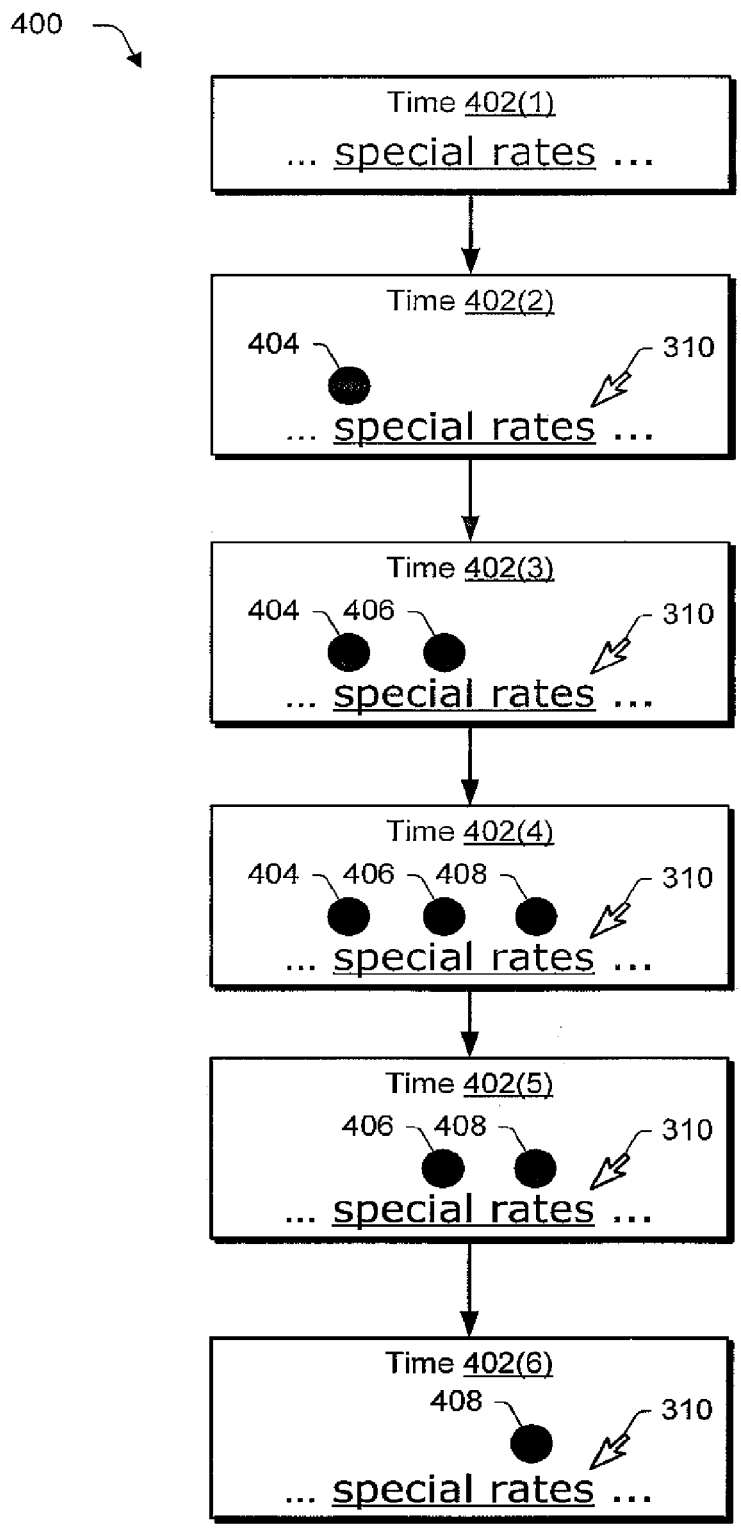
FIG. 4 is an illustration of an animation of an indication of a delay that may be incorporated within the user interface of FIG. 3.

The delay may be indicated in a variety of ways. For instance, the delay may be indicated as a graphical build-up and subsequent count down of a representation of a predetermined amount of time (block 208). FIG. 4, for instance, is an illustration of an animation 400 of the indication 312 of a delay that may be incorporated within the user interface 300 of FIG. 3. The animation 400 includes a plurality of boxes which represent successive points in time 402(1)-402(6).

At time 402(1), the selectable element (e.g., "special rates") is illustrated as within the user interface 300 of FIG. 3 and not selected. It should be noted that in this implementation, the selectable element is indistinguishable from each other selectable element in the user interface 300 and therefore also further simplifies the display of content. At time 402(2), the cursor is positioned proximally to the selectable element, which causes an immediate output of an indication 404 that both additional content is available and that the additional content will be output after a predetermined amount of time, such as a user specified amount of time by a content provider which created the content. At time 402(3), the indication 404 is "built up" with another indication 406, and likewise at time 402(3), yet another indication 408 is added to the other indications 404, 406. In this way, the indications 404-408 collectively provide a build-up. A "pause" may then be performed at time 402(4), i.e., time 402(4) may be longer than the other times 402(1)-402(3), 404(5)-402(6). A "count down" is then provided through times 402(5), 402(6) in which the indications 404, 406 are removed, respectively. Thus, the user is immediately notified of a delay in an output of content and can choose whether to output the content and is also informed as to a relative amount of time that will be consumed by the delay. It should be apparent that a wide variety of other timer indications is also contemplated, for instance, the order at which the indications are displayed may be changed (e.g., "flip" the direction when a corresponding overlay loads to the left instead of the right), and so on.

When the predetermined amount of time has expired while the cursor remains positioned proximal to the selectable element, an overlay is displayed as layered over at least a portion of the content (block 210) that includes the additional content. Therefore, the user may view the additional content concurrently with at least some of the content that was initially displayed, further discussion of which may be found in relation to the following figures.

Figure 5:
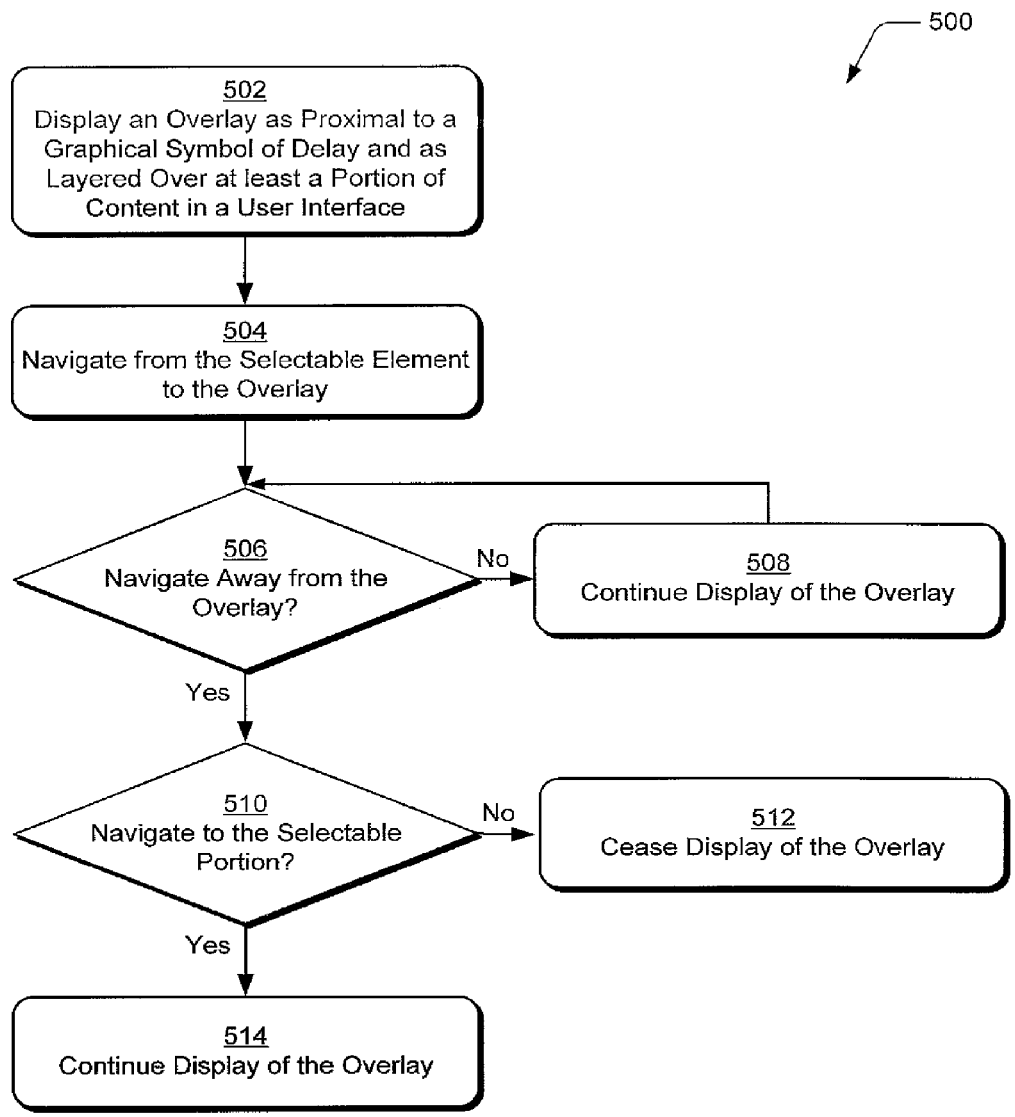
FIG. 5 is a flow diagram depicting a procedure in an exemplary implementation in which navigation is described to additional content displayed as an overlay over initial content.

FIG. 5 depicts a procedure 500 in an exemplary implementation in which navigation is described to additional content displayed as an overlay over initial content. During the discussion of the procedure 500 of FIG. 5, reference will also be made to the user interface 600 of FIG. 6.

An overlay is displayed as proximal to a graphical symbol of delay and as layered over at least a portion of content in a user interface (block 502). For example, as previously described in the procedure 200 of FIG. 2, when the user positions a cursor proximally to a selectable item for at least a predetermined amount of time, the timer module 120(c) may then cause the additional content to be output. In other words, the user may "hover" the cursor over the selectable item without manually initiating an action after providing "focus" to the selectable item, e.g., the positioning of the cursor.

Figure 6:
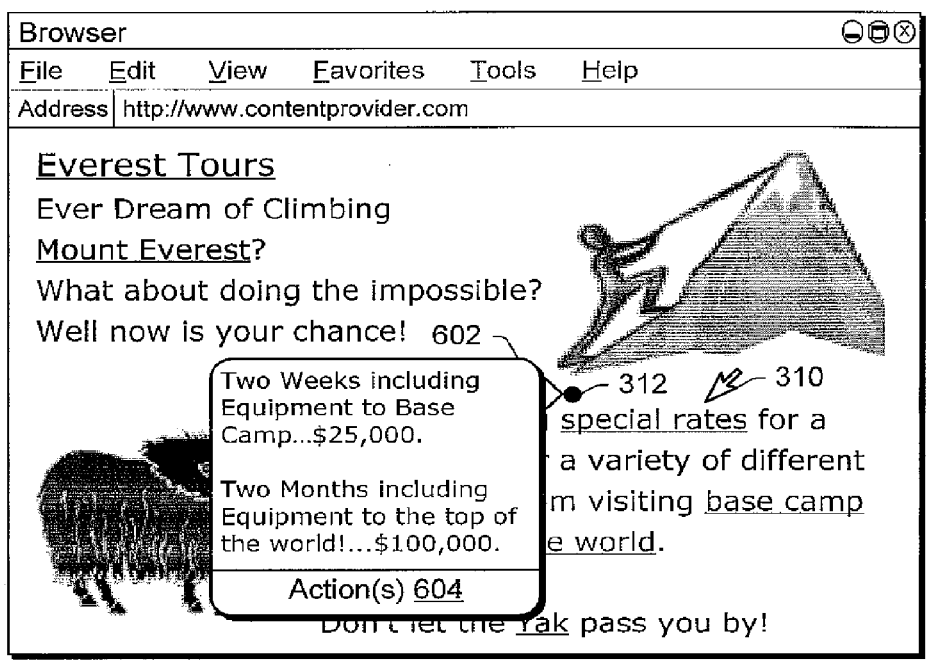
FIG. 6 is an illustration of an exemplary user interface having an overlay of additional content displayed proximally to an indication of delay in a display of initial content according to the procedure of FIG. 5.

As shown in FIG. 6, for instance, additional content 602 is output as an overlay over content initially displayed in the user interface of FIG. 3. The additional content 602 is displayed proximally to the indication 312 of delay and thus appears "anchored" to the indication 312. The additional content 602 relates to the selectable element, which in this case further describes the "special rates".

Navigation may then be performed from the selectable element (e.g., "special rates") to the overlay (block 504) having the additional content. A determination may then be made as to whether navigation is performed away from the overlay (block 506). For example, the timer module 120(c) may monitor movement of the cursor 310 and determine whether the cursor 310 remains on or near the overlay 602. In not ("no" from decision block 506), display of the overlay is continued (block 508).

When navigation is performed away from the overlay ("yes" from decision block 506), a determination is then made as to whether the user has navigated back to the selectable portion (decision block 510). If not ("no" from decision block 510), display of the overlay is ceased (block 512). For instance, when the user causes the cursor 310 to be moved outside the bounds of the overlay 602 and not back to the selectable portion (e.g., "special rates"), the overlay may be removed from the user interface 600. When navigation is performed back to the selectable portion ("yes" from decision block 510), however, display of the overlay is continued (block 514).

The overlay 602 is further illustrated in FIG. 6 as having one or more actions 604 that may be performed in relation to the selectable item. For example, the action 602 may relate to action that may be performed in relation to content obtained from a web address (e.g., "save" and "open"), content stored locally (e.g., "send to"), and so on. Naturally, a variety of other actions are also contemplated without departing from the spirit and scope thereof.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A processor-executable method, comprising:

outputting content for display as a user interface having one or more selectable elements;

outputting a graphical symbol in the user interface that indicates an amount of time of a delay of a user-specified amount of time before additional content is displayed when a cursor is positioned proximally to one of the one or more selectable elements, wherein the graphical symbol indicates the delay of the user-specified amount of time automatically, without user interruption, as a graphical build-up from a first displayed representation to a second displayed representation and a subsequent graphical countdown from the second displayed representation back to the first displayed representation;

outputting the additional content in response to positioning the cursor proximally to the one of the one or more selectable elements for the user-specified amount of time; and disabling display of the additional content and preventing the additional content from being displayed during a subsequent positioning of the cursor proximal to the one of the one or more selectable elements when the cursor is navigated to the additional content and then back to the one of the one or more selectable elements.

2. The method as recited in claim 1, wherein the selectable elements are hyperlinks.

3. The method as recited in claim 1, wherein the additional content, when displayed, is output as an overlay over at least a portion of the content.

4. The method as recited in claim 1, wherein the additional content, when displayed:

is output as an overlay over at least a portion of the content; and includes one or more representations of one or more actions.

5. The method as recited in claim 1, further comprising:

obtaining, from a content provider over a network, the content having the one or more selectable elements;

setting, by the content provider, the user specified amount of time, and wherein, the one of the one or more selectable elements is a hyperlink to the additional content.

6. The method as recited in claim 1, further comprising:

obtaining, through execution of a module maintained in local storage of a client that performed the outputting, the content having the one or more selectable elements; and setting, by a creator of the module, the user specified amount of time.

7. The method as recited in claim 1, wherein the additional content is output in the user interface causing the cursor to be navigable between the proximal position to the one of the one or more selectable elements and the additional content.

8. The method as recited in claim 1, further comprising:

outputting the additional content when the cursor is positioned proximally to the one of the one or more selectable elements for the user-specified amount of time; and ceasing display of the additional content when the cursor is no longer positioned proximally to the one of the one or more selectable elements or the additional content.

9. A processor-executable method, comprising:

outputting a graphical symbol, indicating a delay of an amount of time, proximally to one of a plurality of selectable elements when a cursor is positioned proximally to the one of the plurality of selectable elements in a user interface, wherein the graphical symbol indicates the delay of the amount of time automatically, without user interruption as a graphical build-up from a first displayed representation to a second displayed representation and a graphical countdown from the second displayed representation back to the first displayed representation;

outputting additional content that corresponds to the one of the plurality of selectable elements when the cursor is positioned proximally to the one of the plurality of selectable elements for the amount of time; and disabling display of the additional content and preventing display of the additional content during a subsequent positioning of the cursor proximal to the one of the plurality of selectable elements when the cursor is navigated to the additional content and then back to the one of the plurality of selectable elements.

10. The method as recited in claim 9, wherein the additional content is output proximally to at least a portion of the graphical symbol thereby causing the portion of the graphical symbol to be viewable concurrently with the additional content.

11. The method as described recited in claim 9, wherein the additional content is output as an overlay over at least a portion of the content.

12. One or more computer readable media comprising computer executable instructions that, when executed by one or more processors, direct a computer to:

output a user interface having content that includes a plurality of hyperlinks, wherein, at least one of the plurality of hyperlinks is to indicate a predetermined amount of time of a delay before additional content is output when a cursor is positioned proximally to the at least one of the plurality of hyperlinks, and the predetermined amount of time of the delay is indicated through use of a graphical symbol that automatically, without user interruption, graphically builds-up from a first displayed representation to a second displayed representation and then graphically counts down from the second displayed representation back to the first displayed representation; and disable display of the additional content and prevent the additional content from being displayed during a subsequent positioning of the cursor proximal to the one of the plurality of hyperlinks when the cursor is navigated to the additional content and then back to the one of the plurality of hyperlinks.

13. One or more computer readable media as recited in claim 12, wherein the at least one of the plurality of hyperlinks is output so it is not distinguishable from another one of the plurality of hyperlinks that is not to indicate the user-specified delay.

14. One or more computer readable media as recited in claim 12, wherein the buildup is indicated through addition of displayable elements to the first displayed representation and the countdown is indicated through removal of at least part of the displayable elements from the second displayed representation.

* * * * *